(12) United States Patent
Schonlau et al.

(10) Patent No.: US 6,422,124 B1
(45) Date of Patent: Jul. 23, 2002

(54) BRAKE POWER TRANSMISSION DEVICE, ESPECIALLY FOR MOTOR VEHICLES

(75) Inventors: Jürgen Schonlau, Walluf; Hans-Jörg Feigel, Rosbach; Ralf Harth, Darmstadt; Holger Von Hayn, Bad Villbel; Steffen Linkenbach, Eschborn; Wolfgang Ritter, Oberursel; Detlef Wasel, Frankfurt am Main, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/554,367

(22) PCT Filed: Nov. 16, 1998

(86) PCT No.: PCT/EP98/07314

§ 371 (c)(1),
(2), (4) Date: Aug. 10, 2000

(87) PCT Pub. No.: WO99/26826

PCT Pub. Date: Jun. 3, 1999

(30) Foreign Application Priority Data

Nov. 14, 1997 (DE) .......................................... 197 50 514
Mar. 5, 1998 (DE) .......................................... 198 09 363

(51) Int. Cl.⁷ ................................................. F15B 9/10
(52) U.S. Cl. ..................... 91/369.3; 91/369.2
(58) Field of Search ............................. 91/369.2, 369.3, 91/376 R

(56) References Cited

U.S. PATENT DOCUMENTS 5,146,837 A * 9/1992 Inoue ........................ 91/369.3

FOREIGN PATENT DOCUMENTS

| DE | 42 34 041 | 3/1994 |
| DE | 42 34 043 | 3/1994 |
| EP | 901950 | 3/1999 |
| GB | 2 271 402 | 4/1994 |
| WO | 95 01272 | 1/1995 |
| WO | 95 01 272 | 1/1995 |

* cited by examiner

Primary Examiner—Edward K. Look
Assistant Examiner—Thomas E. Lazo
(74) Attorney, Agent, or Firm—Rader, Fishman & Grauer PLLC

(57) ABSTRACT

The present invention relates to a brake-power transmission device, especially for motor vehicles, including an actuated input member, an output member to exert a boosting force, especially on a main brake cylinder, and a control valve arranged in a control housing to regulate the boosting force. An axially movable pressure piece is provided in the area of a reaction member. The pressure piece is supported on the input member or the control housing, thereby permitting changes to be made in the power transmission ratio. There is a general need to provide a brake-power transmission device that enables increased boosting only when required and that allows for mechanical sensing of the brake actuation speed so that immediate maximum boost force can be exerted when required without any time delay. According to the present invention this is achieved by detachably connecting the pressure element to the control housing by way of a coupling element in order to increase boosting on the basis of a relative movement between the input member and the control housing.

26 Claims, 10 Drawing Sheets

BRAKE POWER TRANSMISSION DEVICE, ESPECIALLY FOR MOTOR VEHICLES

TECHNICAL FIELD

The present invention generally relates to vehicle brake systems and more particularly relates to a brake power transmission device.

BACKGROUND OF THE INVENTION

A brake power transmission device of the general type referenced herein is found in EP 705 190 B1. A valve piston of the device is in active connection with a resiliently pretensioned pressure piece which can be moved axially towards a reaction member together with the valve piston. As soon as a predetermined input force is achieved, which overcomes the initial tension of the spring acting upon the pressure piece, said pressure piece stops at the control housing and transmits a portion of the power on the reaction member thus changing the effective surface ratio and at the same time the characteristic booster line. Finally, the pressure piece is in positive engagement with the control housing. This means that the driver, in the operative range above the given input force, has to apply less force with his foot in order to increase the brake power than he would have to apply in the operative are below the given input force. Thus the change of the characteristic line depends on the existing input force (foot force).

The known brake power transmission device offers the driver an uncomfortable functional behavior caused by the fact that the transition between the different characteristic booster lines has a disturbing effect and render the dosage of the brake power more difficult. In case of an emergency braking a certain foot force has always to be exceeded before the brake power transmission device provides a higher boosting ratio. Consequently, valuable time may pass until the predetermined input force has been established. It is important that in case of emergency braking, the brake power is provided quickly and without any time loss because every delay causes a longer stopping distance. On the other hand, the known brake power transmission device also provides the increased boosting force if the input force is only slightly above the given force threshold value and the higher boosting force would not be necessary in principle.

It is the object of the present invention to provide a brake power transmission device enabling a higher boosting only when required by the driver. The device is based on a simple and cost-effective sensing of the brake actuation speed so that a maximum boosting force can be provided immediately after exceeding a predetermined brake actuation speed without any time delay. In other words, the criterion for changing the boosting ratio shall be the actuation speed with which e.g. a brake pedal is actuated. Furthermore the brake power transmission device presents a comfortable operating behavior that can be adjusted particularly well.

According to the invention, this is achieved by detachably connecting the pressure piece to the control housing by means of a coupling element in order to increase boosting on the basis of a relative movement between the input member and the output member or components assigned to it. A considerable advantage of the present invention is that the release criterion is based on the relative displacement speed between valve piston and control housing. Thus the brake power transmission device according to the present invention allows for a detachable coupling between the control housing and the pressure piece if the input member is actuated with high speed thus causing a relative movement between the input member and the output member and/or components assigned to it which the expert in principle is familiar with. Consequently there is the possibility to influence the transmission ratio mechanically on the basis of the actuation speed.

In a favorable embodiment, a coupling element abutting on the control housing is assigned to the pressure piece, said coupling element and engaging into the pressure piece in positive engagement and in a detachable manner. According to the embodiment of the present invention a control device is formed in one piece with the coupling element.

In another embodiment of the present invention a separate control device is provided with a control surface and presents a blocking section which in a first position of the control device engages into a channel for the coupling element and in a second position releases the channel for said coupling element. The functional separation between control (control device) and coupling (coupling element) includes several advantages. On the one hand it offers a particularly reliable function because it excludes that the coupling element jams in an intermediate position. On the other hand the device can be manufactured in a less complicated manner with regard to the tolerances.

DETAILED DESCRIPTION OF THE PREFERRED EMBODIMENTS

Figure 1:
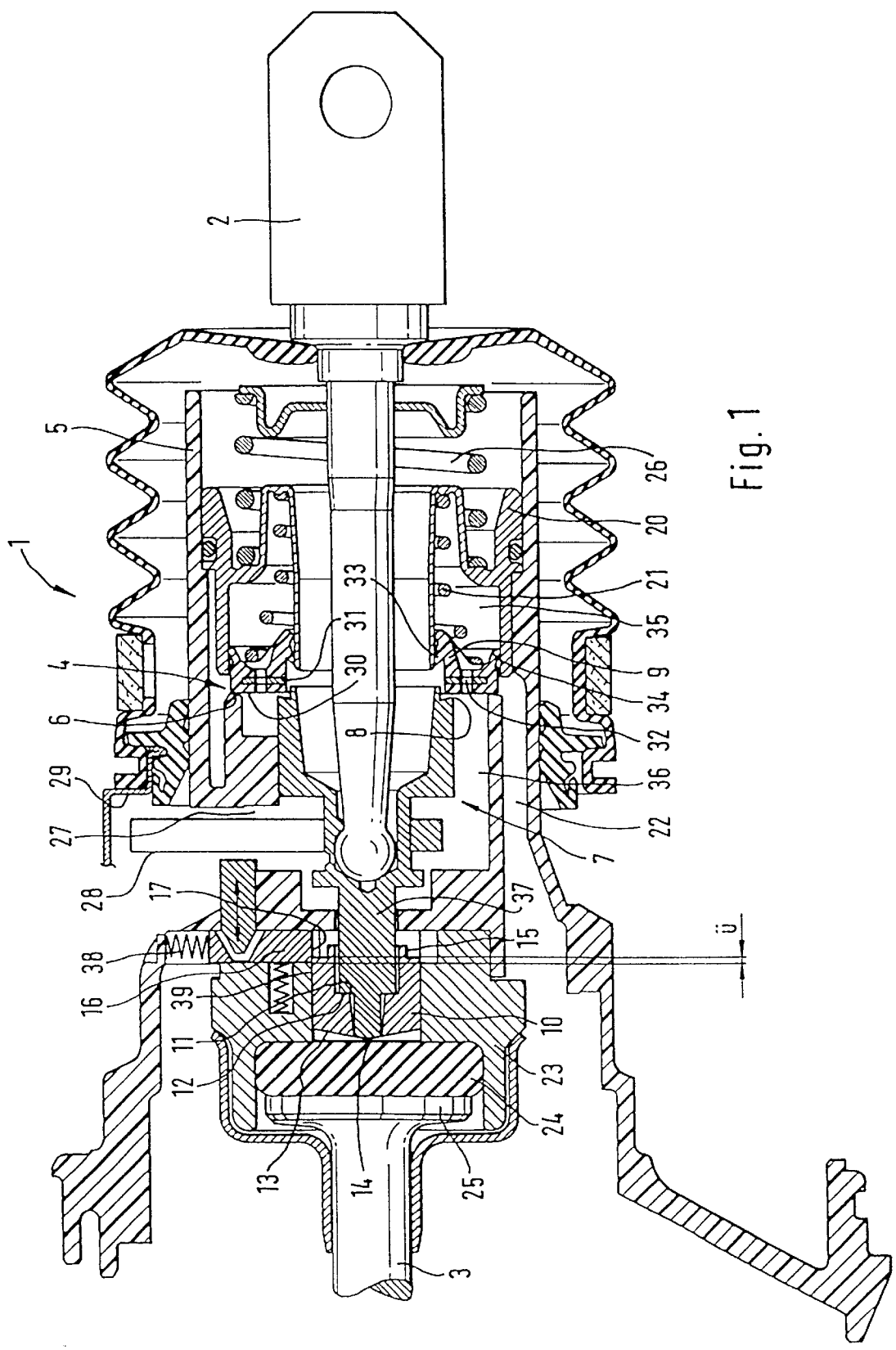
FIG. 1 a first embodiment of the brake power transmission device in a longitudinal section, partly broken away, in normal braking position.

The control unit of a brake power transmission device 1 shown in the Figure serves for controlling and regulating the transmission ratio of a vehicle brake system. Furthermore, the brake power transmission device 1 comprises a booster housing (not shown) which is divided into a low-pressure chamber and a working chamber by an axially movable wall (not shown). The movable wall consists of a diaphragm disk and a flexible diaphragm adjacent to it, forming a rolling diaphragm sealing on an outer circumference of the diaphragm disk and the booster housing. The brake power transmission device comprises also an actuating rod serving as input member 2, and a pushing rod serving as output member 3, said pushing rod acting e.g. upon a hydraulic main brake cylinder (not shown). A control valve 4 actuated by the input member 2 is accommodated in a control housing 5 which supports the movable wall and is guided in the booster housing in a sealed manner. The control valve 4 consists of a first sealing seat 6 provided on the control housing 5, a second sealing seat provided on a valve piston 7 connected with the input member 2 as well as a valve body 9 acting together with both sealing seats 6,8, arranged in a sealed manner in the control housing 5 and guided in a guiding element 20. The valve body 9 is pressed against the valve seats 6,8 by means of a valve spring 21 abutting on the guiding element 20. The working chamber can be connected to the low-pressure chamber by means of a channel 22 extending laterally in the control housing 5.

The brake power is transmitted by means of an rubber-elastic reaction member 24 abutting with the face on the front part 23 of the control housing 5. The force is further transmitted by the top flange 25 of the push rod acting as output member 3 onto the actuating piston of a main brake cylinder (not shown) of the vehicle braking system arranged preferably on the low-pressure side of the booster housing.

The movable wall is maintained in its normal position by means of a readjusting spring (not shown) supported on the front wall of the low-pressure side of the booster housing. Furthermore there is a second pressure spring readjusting spring for the actuating rod 26 abutting on the one hand indirectly on the actuating rod and on the other hand on the guiding element 20. The force of said pressure spring provides a pretensioning of the valve piston 7 or its sealing seat 8 with regard to the valve body 9.

A channel 27 extending nearly radially is formed in the control housing 5 in order to be able to connect the working chamber with the atmosphere when the control valve 4 is actuated. The return movement of the valve piston 7 at the end of a braking operation is limited by a transverse element 28 being spaced from a limit stop 29 provided on the booster housing, as represented in the Figure.

As can also be seen from FIG. 1, the valve body 9 includes an annular sealing surface 30 acting together with the two sealing seats 6,8, said sealing surface being reinforced by means of a metal stiffening disk 31 and provided with several axial outlets 32. Furthermore the valve body 9 includes a sealing lip 33 formed on the radially inner side and a second sealing lip 34 formed on the radially outer side which abut in a sealing manner on the above mentioned guiding element 20 guiding the valve body 9, when said valve body 9 is mounted in the control housing 5, delimiting thus a pneumatic chamber 35 in the control housing 5. The flow channels formed by the outlets 32 and the openings in the sealing surface 30 which are not referenced more in detail, connect the pneumatic chamber 35 with an annular chamber 36 limited by the sealing seats 6,8. The above mentioned channel 27 terminates in said annular chamber 36 so that the pneumatic chamber 35 formed on the side of the valve body 9 remote from the sealing surface 30, is always connected with the working chamber and pressure is compensated at valve body 9.

Consequently, the described arrangement reduces the difference between the response force of the brake power transmission device and the restoring force acting on the valve piston 7 so that it is possible to increase the restoring force in case of a constant response force or to reduce the response force in case of a constant restoring force.

As can be seen clearly in FIG. 1, the valve piston 7 is formed in two parts at the end 37 near to the reaction member and includes a pressure piece 10 which can be moved in axial direction relative to the valve piston 7 and has the form of a bushing being movable together with the valve piston 7 towards the reaction member 24. For this reason the valve piston 7 is provided with a shoulder 11 supporting on a step 12 of the pressure piece 10. As can be seen in the figure, shoulder 11 and step 12 have such a form that the pressure piece 10 is entrained in positive engagement in axial direction of the reaction member 24 or abuts on valve piston 7. It is not possible for the valve piston 7 to entrain the pressure piece 10 in the opposite direction, i.e. away from the reaction member 24. In the represented normal braking position, the pressure piece 10 acts on the reaction member 24 with its face 13, in addition to the contact face 14 of the valve piston 7 near to the reaction member. On the end of the pressure piece 10 away from the reaction member there is a circumferential annular step 15 extending radially to the outside and permitting a coupling element 16 to engage into it. In this embodiment the coupling element 16 is formed as a radially movable slide being pretensioned elastically towards pressure piece 10 by means of a radially acting pressure spring 38. According to FIG. 1, the coupling element 16 serves as a control element at the same time including a control face 17 on its end near to the pressure piece, said control face 17 abutting on the radial circumference 39 of the pressure piece 10. As results furthermore from the drawing, there is an overlapping distance ü in the normal braking position with which the control face 17 abuts on the circumference 39. As a consequence the relative movement between the valve piston 7 and the control housing 5 is not sufficient for the coupling element 16 to engage in step 15 so that there is a form-locking power transmission between control housing 5 and pressure piece 10.

Figure 2:
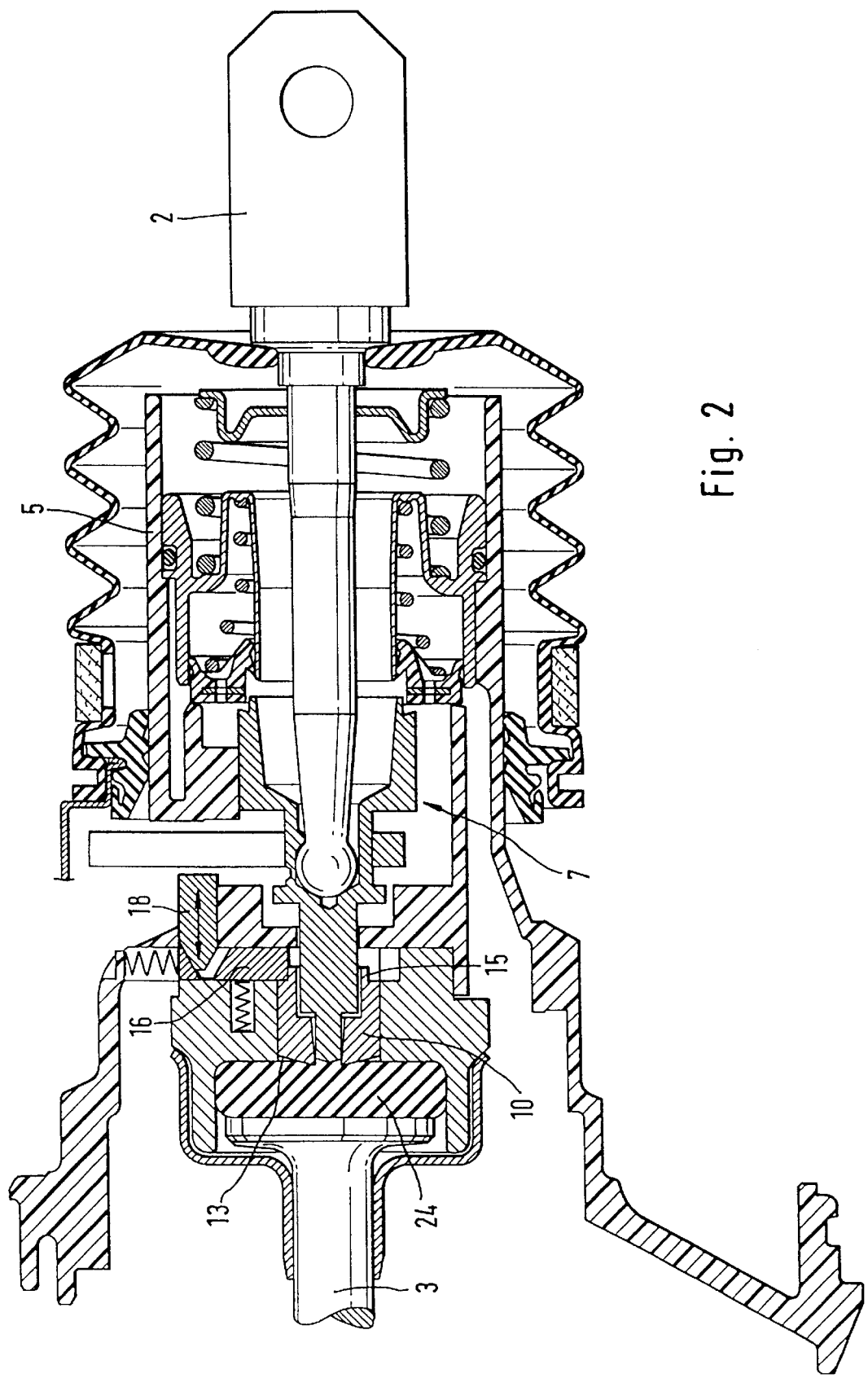
FIG. 2 the brake power transmission device according to FIG. 1 in the active emergency braking position.

In the functional position represented in FIG. 2, input member 2 and valve piston 7 were accelerated so quickly in the direction of the reaction member 24, that there is a relative movement between the valve piston 7 and the control housing 5 during which the coupling element 16 engages in a form-locking manner into the step 15 of the pressure piece 10 so that the above described power transmission is achieved. This measure permits to direct a boosting power acting on the control housing by means of the movable wall, over the pressure piece 10 and its face 13 to the reaction member 24. Consequently the boosting force acts on the reaction member 24 by means of the pressure piece 10. The power transmission is released as follows. First the driver moves the input member 2 axially away from the reaction member 24. Thereby the second sealing seat 8 is moved into a closed position and at the same time the first sealing seat 6 is opened so that the working chamber is connected with the low-pressure chamber. Thus there is no pressure difference on the movable wall and the control housing 4 is displaced in the inoperative position due to the spring force. As a consequence there is no axial force from the control housing 5 acting on the coupling element 16. Furthermore the release element 18 is disengaged with its wedge surface.

Figure 3:
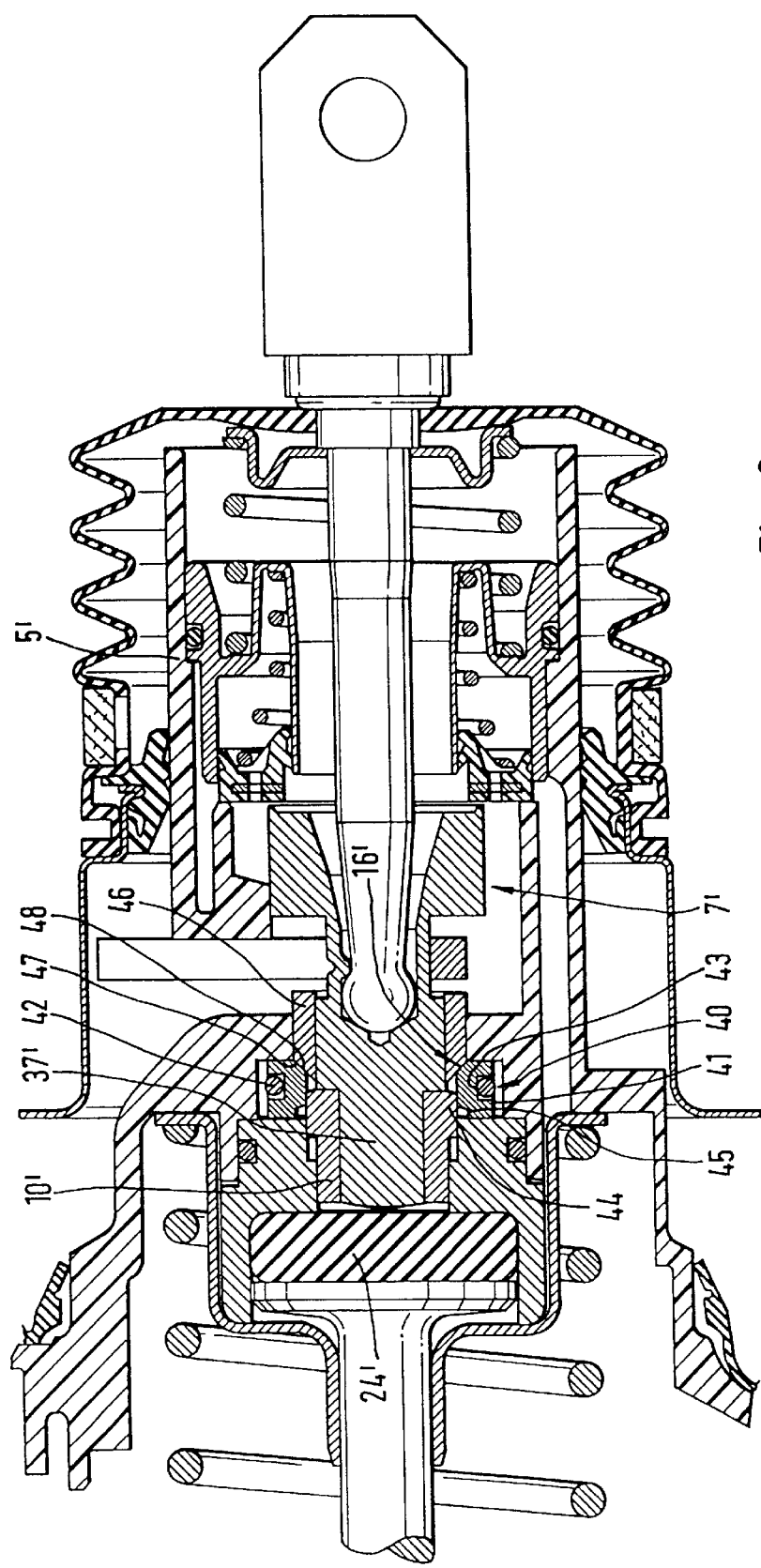
FIG. 3 a second embodiment of the brake power transmission device according to the present invention in normal braking position.

Structure and functioning of the brake power transmission device according to FIG. 3 correspond to FIGS. 1 and 2 with the exception of some details of the coupling element. Accordingly, the corresponding components are designated with the same reference numerals and a prime mark. As can be seen, the coupling element 40 is a disc shaped body which is expandable in radial direction and acted upon by a spring element 42 encompassing the case 41 of the coupling element 40. Due to the spring force the coupling element 40 is always tending to move as much as possible to the radially inner side towards the valve piston 7 providing thus the smallest possible circumference. The Figure shows as an example that the coupling element 40 is provided with a groove 43 containing the spring element 42 which is formed as a ring made of rubber in a favorable manner. Like in the embodiment of FIG. 1 the pressure piece 10' is arranged in a movable manner on the front end 37' of the valve piston 7' and includes a collar 44 on the end remote from the reaction member 24'. At last, the coupling element 40 is provided with a radial groove 45 at its end adjacent to the reaction element 24' for abutting on the collar 44. As can be seen clearly, the overlapping between a control surface of the coupling element 40 and the circumference of the coupling element 40 is sufficient in the normal braking position represented in the drawing, so that there is no power transmission between coupling element 40 and control housing 5'. The Figure shows also a release element 46 having an annular form and being guided movably in axial direction between an opening in the control housing and a cylindrical outer surface of the valve piston 7. On the end adjacent to the reaction element there is an conical expulsion surface 47 being in contact with a counter-surface 48 on the coupling element 40 which is conical, too. In the following the locking and unlocking mechanism is described.

Figure 4:
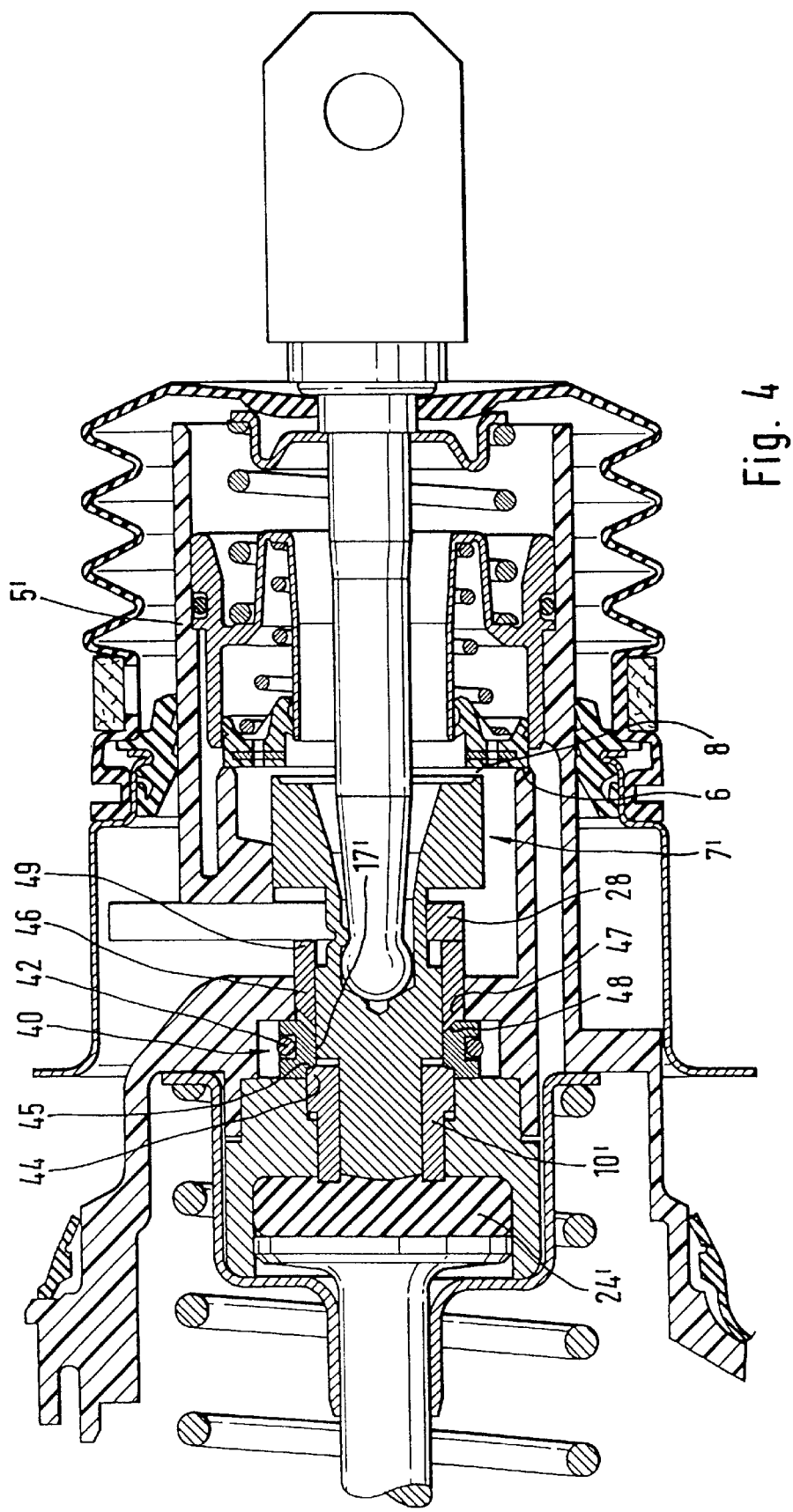
FIG. 4 a brake power transmission device according to FIG. 3 in active emergency braking position.

As represented in FIG. 4, the brake power transmission device is in a position in which the maximum boosting force is transmitted via the pressure piece 10' to the reaction member 24'. The Figure further shows that the coupling element 40 with its groove 45 engages the collar 44 of the pressure piece 10 from behind ensuring thus a power transmission from the control housing 5' via the pressure piece 10' to the reaction element 24'. This was achieved by the fact that the input member 2' was pushed down with high speed causing a relative movement between the valve piston 7' and the control housing 5', so that the overlapping on the control surface 17' is used-up and the coupling element 40 latches in due to the force of the spring 42 acting radially to the inside. In this position the release member 46 abuts on the transverse element 28 with its end portion 49 and there is clearance between the expulsion surface 47 and the counter-surface 48 assigned to this. The release operation is as follows. The input member 2 is pulled back thus reducing the compression onto the reaction member 24' and releasing the first sealing seat 6 in order to be cross-flowed. Then the sealing seat 8 is closed so that the working and the low-pressure chamber are evacuated and there is no pressure difference at the moveable wall. Due to the effect of the spring the control housing 5' is pushed back until the release member 46 with its end portion 49 abuts on the transverse element 28 and is thus supported axially. At the same time the receding control housing 5' presses the coupling element 40 with its counter-surface 48 onto the expulsion surface 47 with the consequence that the coupling element 40 tends to expand radially to the outside along the inclined plane until the groove 45 releases the collar 44 thus releasing the power transmission. Finally the control surface 17' of the coupling element 40 slides onto the circumference of the pressure piece 10' achieving thus its resting position.

Figure 5:
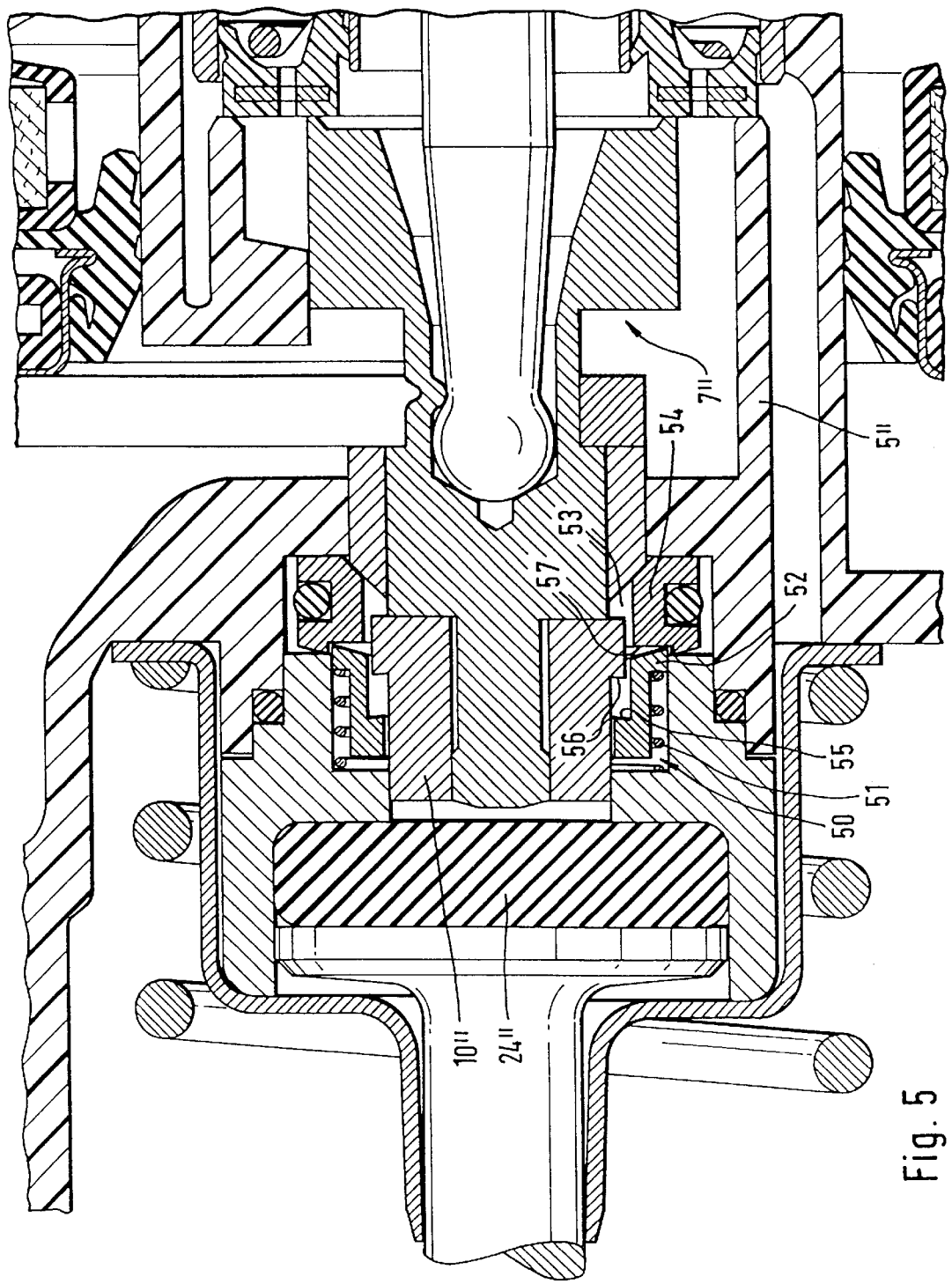
FIG. 5 a third embodiment of the brake power transmission device with a separate control device.

The difference of the third embodiment shown in FIG. 5 with regard to the embodiment of FIG. 3 consists of a separate control element 50. The Figure shows that the control element 50 has an annular form and is arranged radially on the circumference of the pressure piece 10". Said control element is also resiliently pretensioned with a pressure spring 51 and with a projection 52 engages into a channel 53 for the coupling element 54. Consequently the control element 50 with its projection 52 blocks the way of the coupling element 54. Finally, the control element 50 is provided with a stop portion 55 on which the pressure piece 10" can abut with its annular collar 56. The coupling operation is as follows. In case of a particularly quick actuation of the input member 2 the valve piston 7" together with the pressure piece 10" moves towards the reaction member 24" deforming it until the annular collar 56 abuts on the stop portion 55 of the control element 50 moving it against the force of the pressure spring 51 towards the reaction member 24 so that the projection 52 releases channel 53 and coupling element 54 with its groove 57 engages behind the stop portion 55 thus ensuring a power transmission from the control housing 5" via the coupling element 54 onto the pressure piece 10" and the reaction element 24". The release operation has already been described in the above mentioned embodiment.

Figure 6:
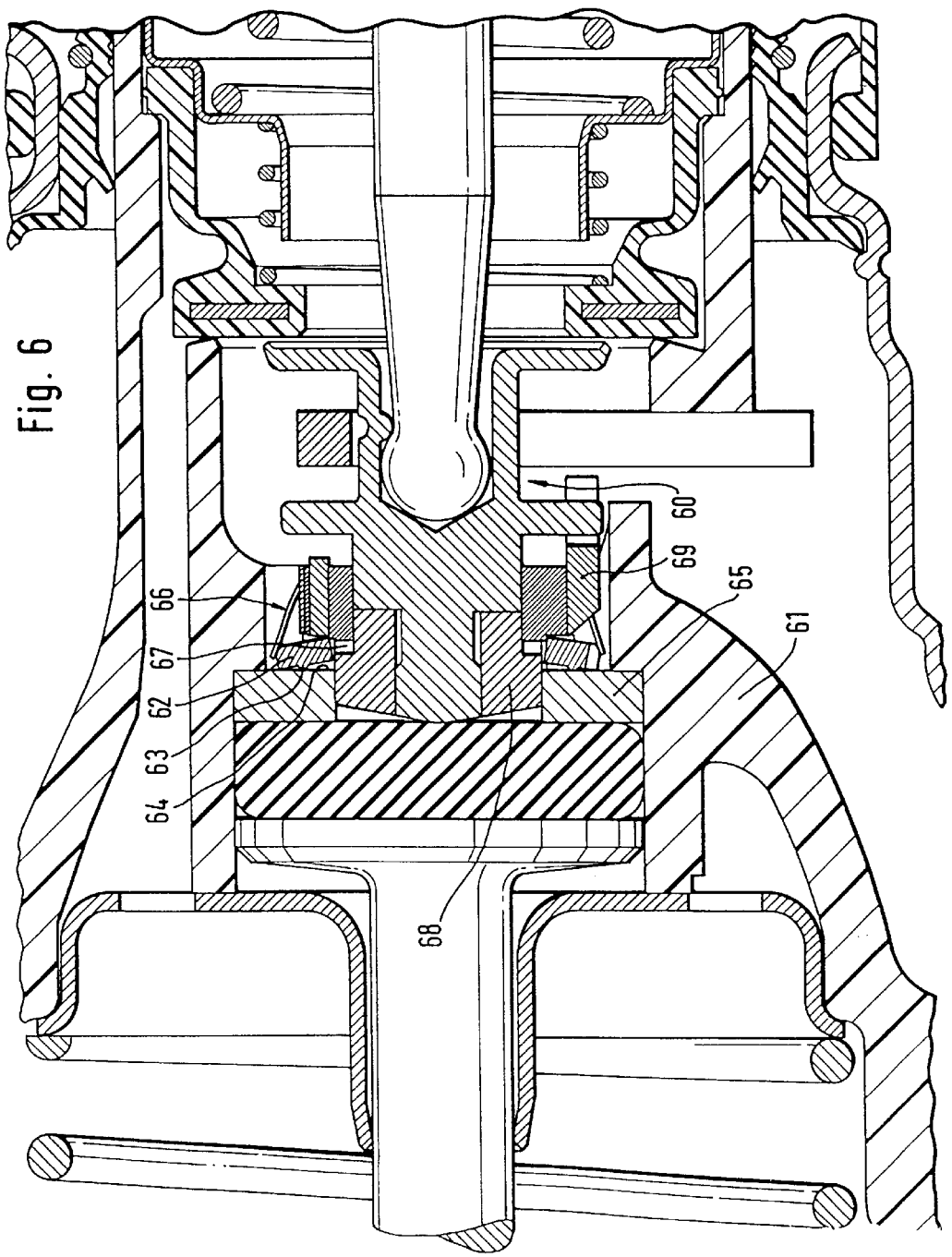
FIG. 6 a fourth embodiment of the brake power transmission device.
Figure 7:
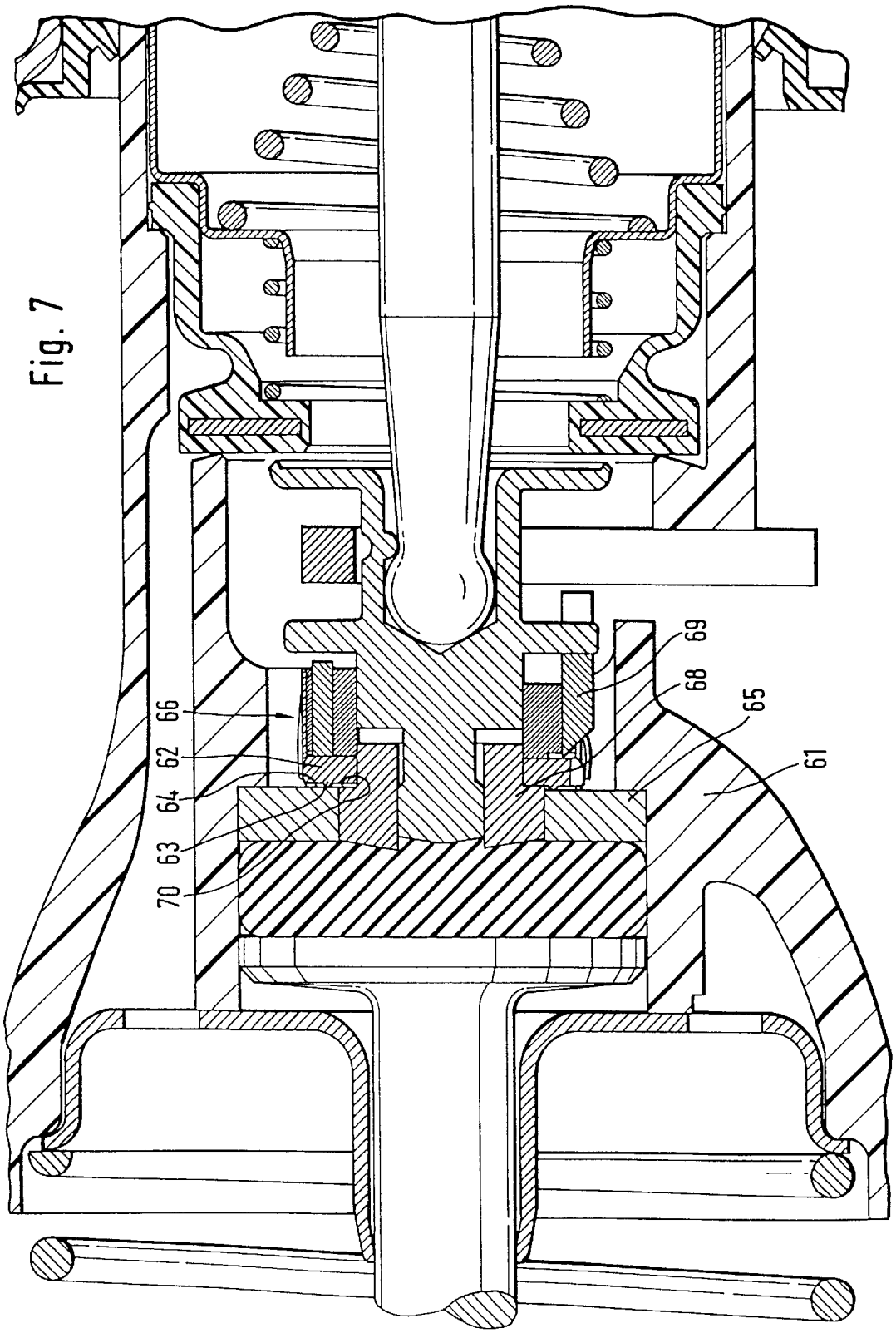
FIG. 7 the embodiment according to FIG. 6 in active emergency braking position.

The embodiment according to the FIGS. 6 and 7 is also based on the principle that a relative movement between the valve piston 60 and the control housing 61 is a criterion for the engagement of the coupling element 62. The coupling element 62 has a disc shaped form and is provided on one side with a projection 63 which abuts in a swiveling manner on the wall 64 of a component 65 assigned to the control housing 61. Furthermore the coupling element 62 is elastically pretensioned in radial direction with an elastic element 66, preferably a leg spring, so that it can engage behind a shoulder 70 for a form-locking entrainment of the pressure piece 68, if there is a certain distance between said pressure piece 68 and said component 65. Due to the spring pretension force acting in radial direction the coupling element 62 nearly slides into the empty space 67. FIG. 7 shows the status in the emergency braking position. During the receding movement of the valve piston 60, a wedge-type release element 69 is used for pulling the coupling element 62 out of the empty space 67. The advantage of this embodiment is that the single components can be produced and mounted in a very cost-effective way.

Figure 8:
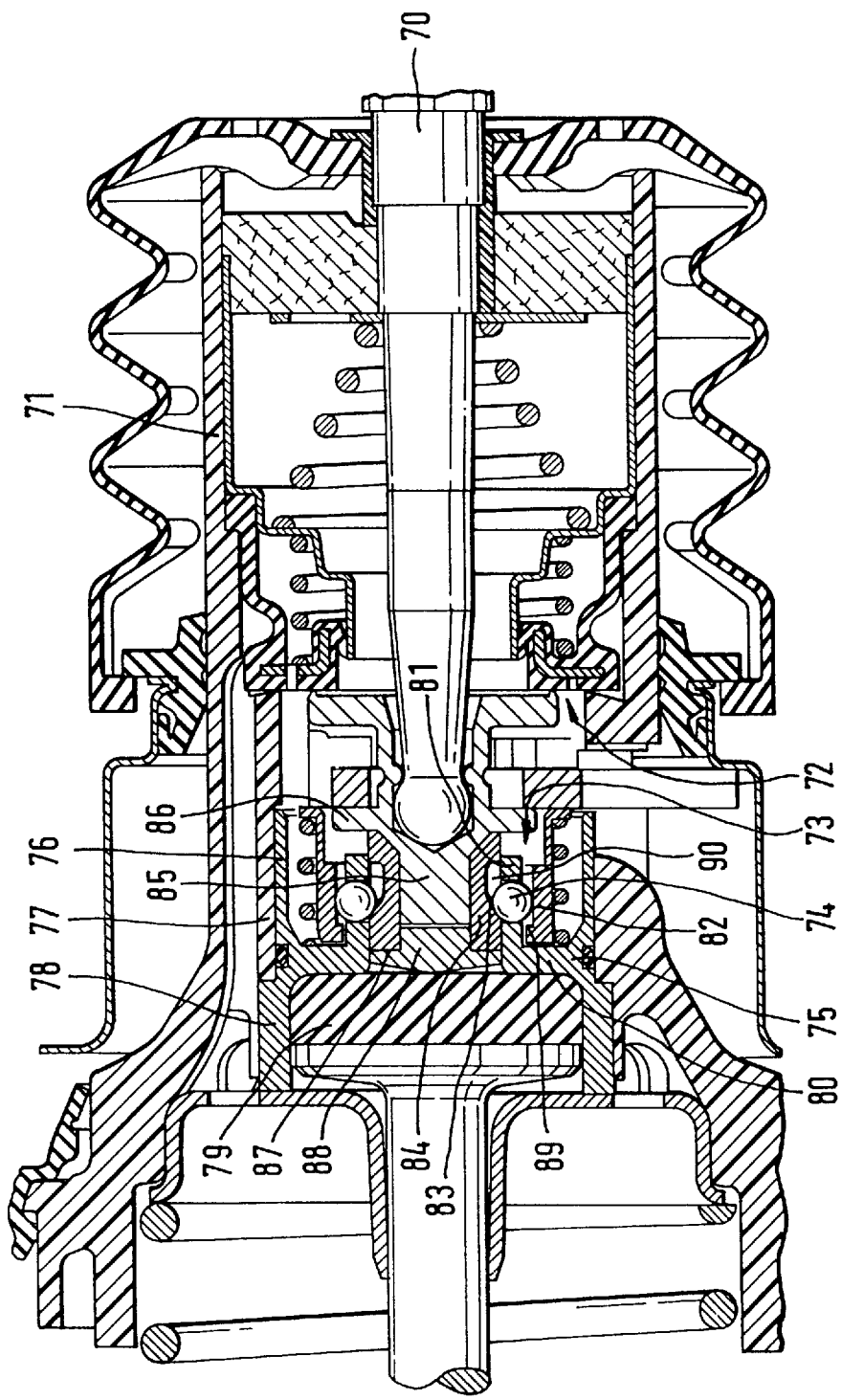
FIG. 8 a fifth embodiment in normal braking position.
Figure 9:
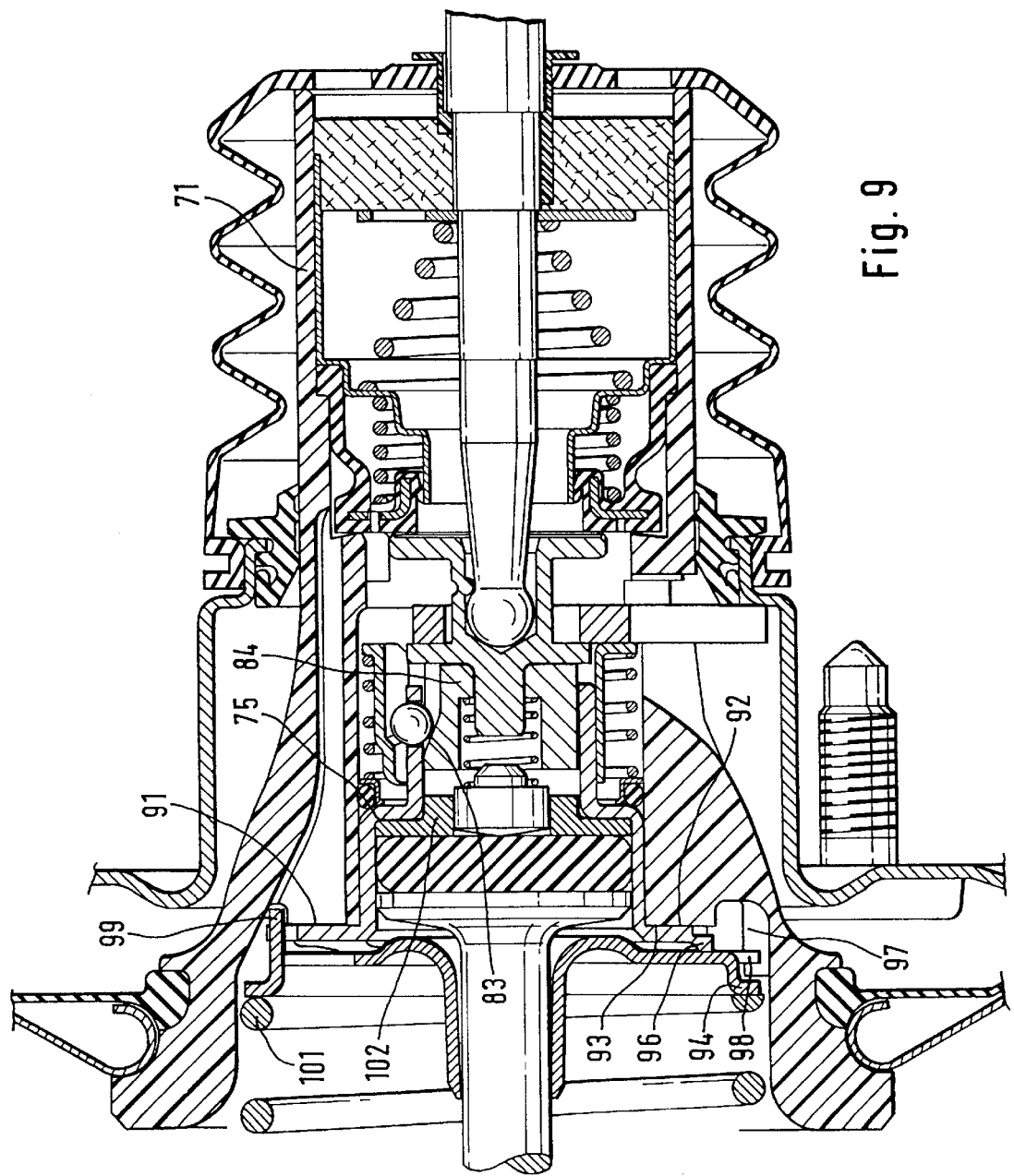
FIG. 9 a sixth embodiment of the brake power transmission device.

The embodiments according to the FIGS. 8 and 9 are based in principle on the fact that the criterion for the change of the transmission (boosting increase) is a relative movement between the input member 70 and the control housing 71. The valve arrangement 72 for the operation of the brake power transmission device does not present any important differences with regard to the above described embodiments, so that the corresponding description is omitted. In both embodiments the coupling element 73 substantially consists of one or more rolling bodies 74 which are retained in axial direction in a retaining or guiding cage 75, but in principle are arranged in such a way that they can be moved in radial direction. The retaining cage 75 abuts on the control housing 71 or is fixed to it and is preferably made of sheet metal which gets the shape of a stepped, sleeve-shaped cage (similar to a rolling bearing ring) by means of punching and metal forming operations. According to the embodiment of FIG. 8, the retaining cage 75 in principle consists of a tube section with a connection piece 76 on the input side that is pushed axially and in a sealed manner into a concentric and radially outer connection piece 77 of the control housing 71, providing thus a reliable centering with regard to the control housing 71. A second connection piece 78 extending towards the output element, the retaining cage 75 straddles the rubber elastic reaction member 79 so that said retaining cage 75 reduces the more or less hydrostatic forces in radial direction, which exist in said reaction member in case of actuation. In other words, the control housing 71, normally made of plastic, is not used for encapsulating the reaction element 79, as is done in the known device. Consequently the service life is considerably increased because in this area there is less tension in the control housing 71.

Retaining cage 75 is also provided with a bottom 80 extending radially to the inside and leaving an opening for the pressure piece 88. It is provided with a collar 81 bended at a right angle towards the input member 70. The collar 81 comprises the above mentioned rolling body 74, e.g. a ball, which is inserted in a hole. Therefore the collar 81 only allows a movement of the rolling body 74 in radial direction. A spring-pretensioned stop element 82 or ring limits the movability of the rolling body 74 radially to the outside in such a way that it cannot slide out of the axial delimitation of the collar 81. A control contour 83, preferably in the form of a ramp, is foreseen radially on the inside, referred to the rolling body, said control contour being provided on the circumference of a sleeve 84, embracing the valve piston 85 fixed to the input member 70. The ramp with an inclination causes a linear connection between the axial displacement of the sleeve relative to the control housing and the radial displacement of the rolling body and can be achieved easily. Curve forms, e.g. parabolic forms, are possible for other requirements, especially a particularly quick coupling in case of a small axial displacement path. The sleeve 84 can be moved relative to the valve piston 85, and the front end of the valve piston 85 engages into the sleeve 84 with a pin in such a way that the sleeve seems to be guided on the pin. When actuated, the sleeve 84 abuts axially on a collar 86 of the valve piston 85. On the other hand, a front surface 87 of the sleeve 84 abuts on the pressure piece 88, so that the actuating force is transmitted to the pressure piece 88 by means of the sleeve 84. In the same way the countervailing force is transmitted directly to the person actuating the brake system. In this condition the rolling body 74 abutting on the control contour 83 has no function (yet) and the pressure piece 88 is supported on the valve piston 85 (input member 70) by means of the sleeve 84. This condition is maintained also if the brake system is actuated slowly, whereby no or only small relative displacements between the input member 70 and the retaining cage 75 are provided.

A very quick actuation of the input member 70 with a relative displacement between said input member 70 and the control housing 71, resp. retaining cage 75 causes a displacement of the sleeve 84 together with the control contour 83 towards the reaction member 79. As a result the rolling body 74 slides down the projection 89 of a spring-tensioned sleeve 82 in such a way that it is pushed from its radially outer original position (on the control surface) into a radially inner actuation position lying e.g. within a groove 90 at the foot of the ramp. Since the rolling body on the one hand is fixed axially in the collar 81 and on the other hand is in positive engagement with the control contour 83 of the sleeve 84, the coupling element 73 is engaged. The reaction power of the brake system is received to a certain extent by the pressure piece 88, the sleeve 84, the rolling body 74 and the retaining cage 75 on the control housing 71 without said brake reaction power being necessarily transmitted to the driver. Thus the driver is disengaged with regard to the force, i.e. he is separated from the reaction of major forces. Now the driver can adjust the control valve 72 freely and independently from high foot forces (reaction forces), so that the wheel brake pressure can be regulated on the basis of the regulated ventilation. The brake power transmission device thus presents a separate characteristic line for the emergency brake operation permitting the driver to regulate the brake power freely and freed from a strong reaction around the activation point after the activation. The present invention thus reproduces the functional connection of the so-called electronic braking assistant with merely mechanical means with the advantage that there can be no faulty releases by means of defective contacts or switches, as is the case with electrical systems. As a result, the device is very robust and also much more cost-effective because no components are required that are electromechanically effective.

The disengagement is done by pulling back the input member 70 so that the control valve 72 is closed and the boosting power which had been introduced, is reduced. But the device still remains engaged. The disengagement operation begins only when the valve piston is pulled back as much that it stops with the collar 86 at a wedge which is inserted in transverse direction into the control housing 71, said wedge being in principle and freely moveable in a limited manner with regard to the valve piston. After the collar 86 abuts on the wedge, the latter is entrained towards a stop on the booster housing in case of a continued withdrawal movement, finally abutting on said booster housing so that the return movement is limited. Since on the one hand the pretension of the stop ring 82 is exhausted (the projection does not push the rolling body into the radially inner coupling position anymore) and, on the other hand, the controlling contour 83 pushing back together with the valve piston 85 presses the rolling body 74 radially to the outside, said rolling body 74 tends to move radially to the outside into the disengaged original position. Herewith the disengagement has taken place, but can, in principle, be repeated whenever required.

Figure 10:
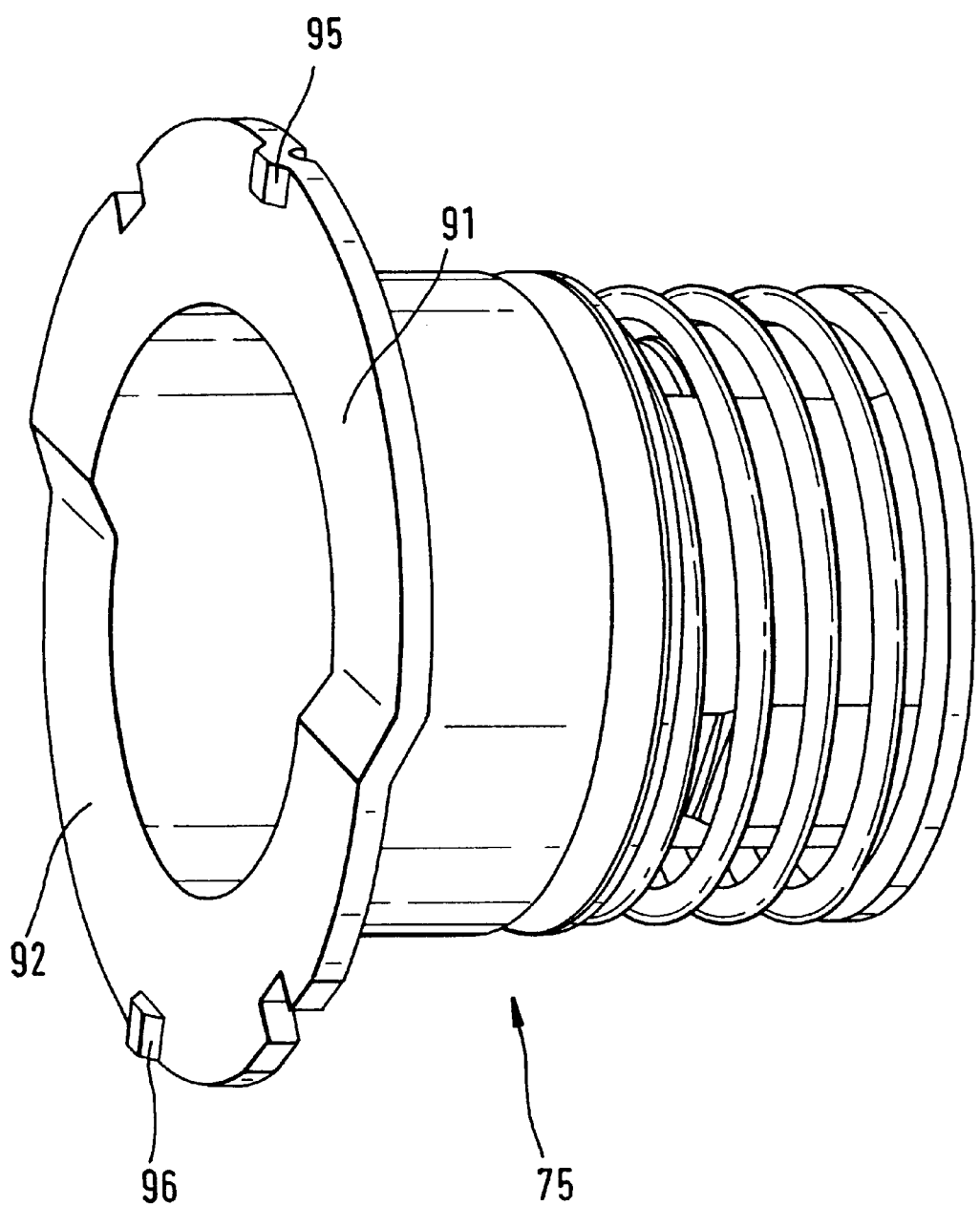
FIG. 10 single components of the sixth embodiment in an enlarged scale.

The embodiment according to FIG. 9 is based substantially on the same principle, but includes additional improvements. Since there is a general need to be able to adapt the activation point, i.e. the relative displacement necessary for activating the system, to the driver, the retaining cage 75 is provided with two abutment surfaces 91,92 for abutting on the control housing 71, which are arranged diametrically to one another and are positioned in a screw-type manner (and double-threaded) in space. On its abutting front surface 93 the control housing 71 includes two assigned and also diametrically arranged thread-type surfaces so that an axial displacement of the control contour 83 can be achieved by twisting the retaining cage 75 relative to the control housing 71. FIG. 10 shows the retaining cage 75 with a spring element for pretensioning the stop 82 in spatial view with the spatially inclined surfaces 91,92. Axially protruding support elements 95,96 serve for abutting a spring plate 94 in a flat and secure manner on the retaining cage 75. The support elements provide for a compensation of the level of the two thread-type surfaces 91,92. The control housing 71 includes at least one tooth- or cam-shaped projection 97 extending radially to the inside towards the retaining cage 75, so that the arrangement is secured against being unintentionally released, in particular distorted. Each projection 97 abuts on an arm 98 or engages in a recess of the spring plate 94 in order to achieve a form-locking protection. The spring plate engages with one arm 99 into a recess of the retaining cage 75 in a form-locking manner. This condition can be easily achieved by that the spring plate 94 is lifted against the force of the unit spring 101 and twisted around its axis until the desired axial displacement has been reached. Then the spring plate 94 is lowered providing thus the form-locking block described above. It has to be considered that the same effect can be obtained by each projection 97 engaging directly in circumferential recesses of the retaining cage 75, without abandoning the object of the present invention. The condition described above is realized during the production of the transmission device before fastening the two housing halves together in an nondetachable manner. But there is also the possibility of manipulators which are arranged on the closed housing and with which the releasing threshold (activation point) can be set subsequently in the same manner, e.g. by the driver him/herself for his/her own needs.

One adjustment possibility which influences the characteristic boosting line (relation between the applied input force, i.e. foot force, and the output force) and which does not require a constructional modification or expensive production changes, is provided according FIG. 9 by that an substitute piece 102 with an abutment surface of a predetermined size on the reaction member 79 can be inserted into the retaining cage 75. This substitute piece 102 can be exchanged against other substitute pieces with different abutment surfaces.

As already briefly described, the embodiments for high-duty tasks (with particularly high forces) can include several rolling bodies 74 arranged in regular angles to one another. In order to extend the fatigue strength, particularly of the sleeve 84 with control contour 83, it is an advantage for all embodiments with rolling bodies 74 to adapt the control contour 83 to the rolling body 74 with regard to their spatial extension so that there is possibly no excessive Hertzian stress (point-like). An approximate touch of the lines is particularly advantageous in this context and can be achieved when balls are used as rolling bodies, so that the ramp-like control contour gets a channel-like spatial shape approximated to the ball radius. The same osculation as described above does also make sense for the stop 82 in the abutment area on the rolling body 74 since also in this area very excessive and very limited pressings with regard to the surface may occur. Furthermore it goes without saying that the highly stressed components 82,84 mentioned above are made of high-strength material, e.g. ball bearing steel, in order to further minimize the wear and tear.

What is claimed is:

1. Brake power transmission device for motor vehicles, comprising:
    an actuated input member
    a valve piston,
    an output member to exert boosting force on a main braking cylinder, a control valve arranged in a control housing to regulate the boosting force,
    an axially movable pressure piece provided in proximity to a reaction member, wherein the pressure piece is supported on the input m ember o r the control housing thus permitting changes to be made to the power transmission ratio, wherein said pressure piece is detachably connected to the control housing by means of a coupling element in order to increase the boosting on the basis of a relative movement between the input member and the control housing.

2. Brake power transmission device according to claim 1, further including the coupling element abutting against said control housing, said coupling element adapted for catching the pressure piece in a form-locking and detachable manner.

3. Brake power transmission device according to claim 1, wherein the pressure piece is guided in an axially moveable manner on a circumferential surface of the valve piston.

4. Brake power transmission device according to claim 3, wherein the coupling element includes a control surface which on the basis of the advance movement of the valve piston travels through first and second positions, and that such coupling element catches the pressure piece in the second position.

5. Brake power transmission device according to claim 4, wherein the coupling element is arranged in a radially displaceable manner and abuts on the pressure piece with at least one abutment surface.

6. Brake power transmission device according to claim 4, wherein the coupling element is flexible in radial direction.

7. Brake power transmission device according to claim 4, wherein the coupling element is pretensioned radially to the inside.

8. Brake power transmission device according to claim 4, further including a separate control unit including a projection, which engages in a channel for the coupling element in a first position of the control unit and releases the channel for the coupling element in a second position.

9. Brake power transmission device according to claim 4, further including a release member which interacts with the coupling element.

10. Brake power transmission device according to claim 9, wherein the release member is supported directly or indirectly on a limit stop of a booster housing.

11. Brake power transmission device according to claim 9, wherein the release member is abutted on a transverse element which is abutted on a limit stop of a booster housing.

12. Brake power transmission device according to claim 4, wherein the coupling element includes at least one wedge portion inclined towards a main axis which is foreseen for abutting on an expulsion surface of the release element.

13. Brake power transmission device according to claim 12, wherein the coupling element includes at least one rolling body for the form-locking coupling.

14. Brake power transmission device according to claim 13, wherein said second connection piece axially embraces a reaction member.

15. Brake power transmission device according to claim 13, wherein the rolling body in axial direction is arranged in a fixed manner in a retaining cage and that the rolling body is movable between two final positions in radial direction.

16. Brake power transmission device according to claim 15, further including at least one substitute piece inserted into the retaining cage for influencing the characteristic boosting line.

17. Brake power transmission device according to claim 15, wherein said rolling body is received into a control contour and that an axial displacement of the control contour leads to a radial displacement of the rolling body in one of the two final positions.

18. Brake power transmission device according to claim 17, further including a sleeve, where the control contour is disposed on the circumference of said sleeve and that the sleeve embraces the valve piston concentrically.

19. Brake power transmission device according to claim 18, wherein the control contour has a ramp-like form with an inclination.

20. Brake power transmission device according to claim 19, wherein the control contour is adapted to receive the rolling body conforming at least in part to it.

21. Brake power transmission device according to claim 15, further including a pressure piece which abuts on a valve piston in the first final position of the rolling body and that the rolling body by displacing the controlling contour relative to the control housing is movable into the other final position in such a way that the pressure piece is supported by the control housing in axial direction directly by means of the rolling body and the retaining cage.

22. Brake power transmission device according to claim 21, wherein a ball is used as rolling body.

23. Brake power transmission device according to claim 15, wherein the retaining cage is a tube and includes a first connection piece adjacent to an input member and a second connection piece adjacent to an output member, wherein said retaining cage includes a bottom which extends radially.

24. Brake power transmission device according to claim 23, wherein the bottom of the retaining cage is provided with a collar, axially bent at right angles, with at least one recess for receiving at least one rolling body.

25. Brake power transmission device according to claim 23, wherein the retaining cage includes two surfaces arranged in a screw-like manner inclined in the space for abutting on screw-like surfaces assigned thereto on the front side of the control housing.

26. Brake power transmission device according to claim 25, wherein the control housing includes at least one projection with a form-locking effect for engaging into the retaining cage or catching a spring plate.

* * * * *

UNITED STATES PATENT AND TRADEMARK OFFICE
CERTIFICATE OF CORRECTION

PATENT NO. : 6,422,124 B1
DATED : July 23, 2002
INVENTOR(S) : Jürgen Schonlau, Hans-Jörg Feigel, Ralf Harth, Holger Von Hayn, Steffen Linkenbach, Wolfgang Ritter and Detlef Wasel It is certified that error appears in the above-identified patent and that said Letters Patent is hereby corrected as shown below:

Column 9,
Line 44, change "the input m ember o r" to -- the input member or --.

Signed and Sealed this

Fifteenth Day of October, 2002

*Attest:*

*Attesting Officer*

JAMES E. ROGAN
*Director of the United States Patent and Trademark Office*